United States Patent
Mossman, Sr.

[15] 3,687,127
[45] Aug. 29, 1972

[54] COOK STOVE GRID

[72] Inventor: Donald P. Mossman, Sr., 148 W. Rosewood St., Rialto, Calif. 92376

[22] Filed: Sept. 25, 1970

[21] Appl. No.: 75,526

[52] U.S. Cl. .............................................. 126/215
[51] Int. Cl. .......................................... F24c 15/10
[58] Field of Search ..126/39, 39 H, 211, 214, 214 C, 126/215

[56] References Cited

UNITED STATES PATENTS

| | | | |
|---|---|---|---|
| 3,442,261 | 5/1969 | Berlik | 126/215 |
| 1,738,297 | 12/1929 | Hoffman | 126/214 C |
| 2,733,332 | 1/1956 | Mason | 126/215 X |
| 2,833,907 | 5/1968 | Olleo, Jr. | 126/215 X |

FOREIGN PATENTS OR APPLICATIONS

| | | | |
|---|---|---|---|
| 153,877 | 7/1938 | Austria | 126/214 C |
| 821,534 | 11/1951 | Germany | 126/211 |

*Primary Examiner*—Charles J. Myhre
*Attorney*—Charles L. Lovercheck

[57] ABSTRACT

A grid for cook stoves to prevent direct contact of the stove heating element with the cooking vessel thereby preventing scorching of food. The grid includes a spider member made of a relatively thin serpentine shaped spider welded to an inner ring and to an outer ring.

1 Claim, 4 Drawing Figures

PATENTED AUG 29 1972　　　　　　　　　　　3,687,127

Inventor
DONALD P. MOSSMAN SR.

By
Charles L. Lunchick Attorney

COOK STOVE GRID

STATEMENT OF INVENTION

This invention relates to cooking stoves and, more particularly, to a grid for a cooking stove.

The grid disclosed herein eliminates the necessity of constantly stirring foods to prevent scorching and sticking. It eliminates the effort in the process of cleaning the utensils. It utilizes convection heating instead of direct conduction from the burner to the vessel by the formation of free path irradiation from the heating source to the vessel. It results in even distribution of heat.

The device consists of a grid in the form of a six-pointed star of suitable material which lies on the burner element but makes minimum contact with the burner due to the use of many sharp projections like a saw-tooth edge thereby supplying an ample support for a cooking vessel with minimum contact with the heating element.

A solid steel band encircles the spider connecting the points so as to preserve a uniform pattern and also projecting downward below the heating element to maintain concentricity with the burner element. A smaller ring of similar material connecting the inner points of the spider is provided to maintain a uniform configuration. All points of contact of the rings are spot welded.

OBJECTS OF THE INVENTION

It is, accordingly, an object of the invention to provide an improved burner grid.

Another object of the invention is to provide a burner grid in combination with a stove.

Another object of the invention is to provide a burner grid which provides minimum contact between the burner and the grid.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 3 is a lateral view of a portion of the spider.

DETAILED DESCRIPTION OF THE DRAWINGS

Figure 2:
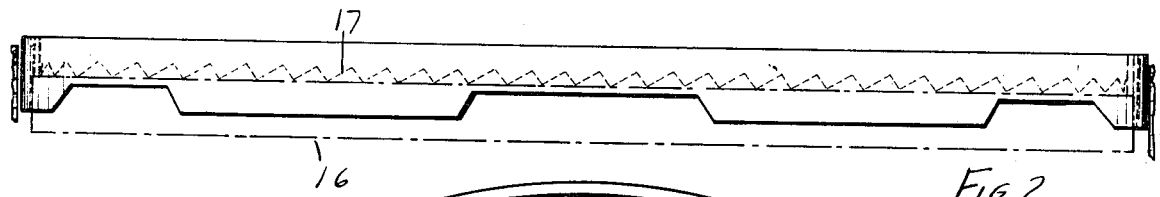
FIG. 2 is a longitudinal cross sectional view of the grid.
Figure 1:
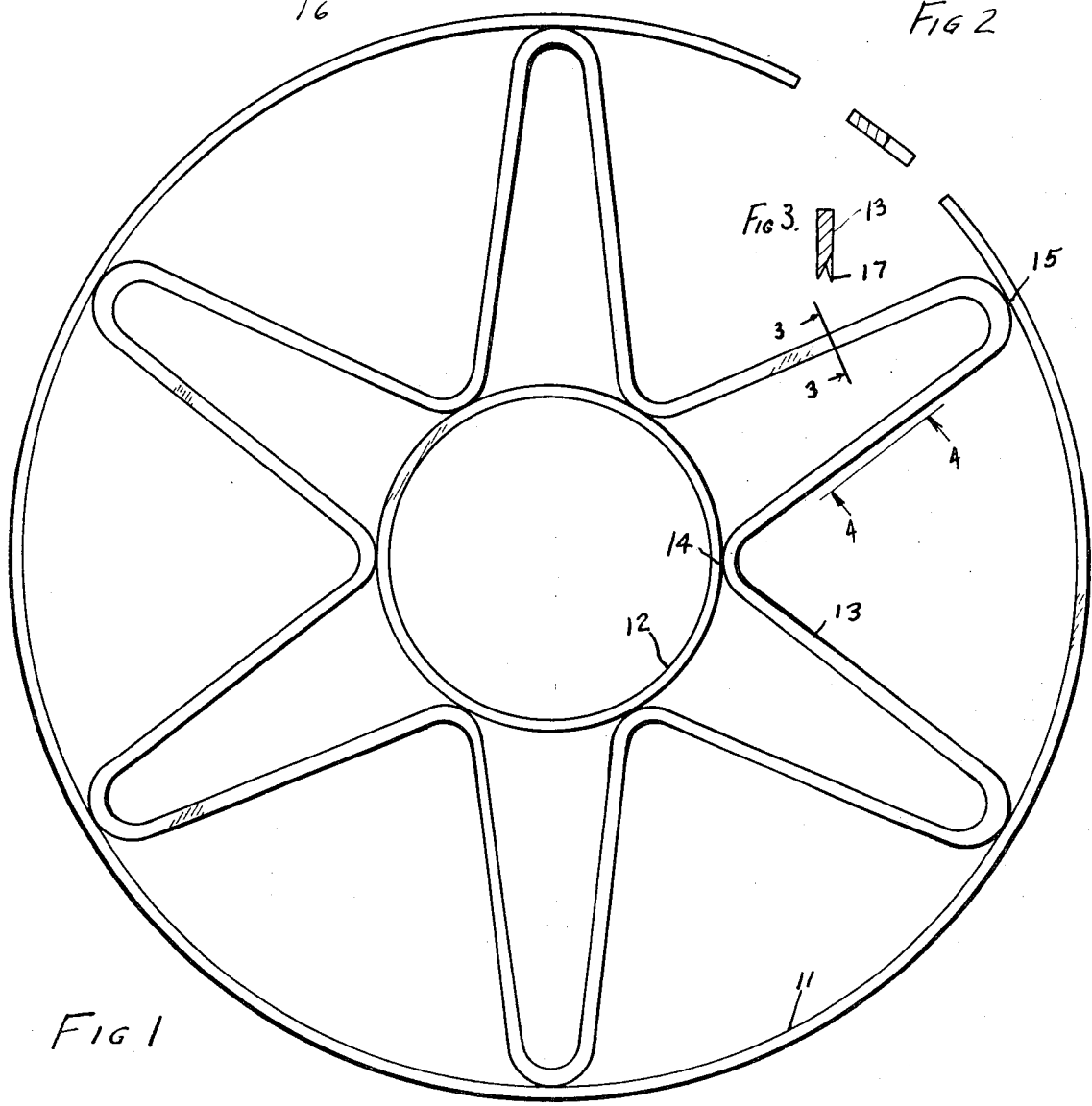
FIG. 1 is a top view of the burner grid according to the invention.
Figure 4:
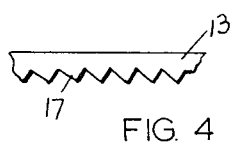
FIG. 4 is a cross sectional view taken at line 4—4 of Fig. 2.

Now with more particular reference to the drawings, the grid shown in Fig. 1 has a large grid outer ring 11 and a small grid inner ring 12. The spider 13 is made up of a thin band of material, such as a bandsaw blade, and bent in serpentine shape and welded to the inner ring 12 at inner crest 14 and welded to the outer ring 11 at its outer crest 15. The bandsaw blade is relatively thin and has teeth 17 facing downwardly which engage the top of the burner 16. The teeth make point contact with the burner and therefore transfer very little heat by direct conduction leaving the heat to be transferred by convection and radiation from the burner to the vessel supported on the grid.

The general shape of the spider with its downward projecting teeth is such as to cross the burner elements and do not follow the configuration thereof; thereby reducing further the small amount of heat that would be carried to the vessel via conduction through the spider elements of the grid.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A grid comprising an outer ring and an inner ring disposed concentric to each other and defining a space therebetween,
    a spider disposed between said outer ring and said inner ring,
    said spider being bent in sinusoidal shape and having its outer crests spot welded to said outer ring and its inner crests spot welded to said inner ring,
    said outer ring extending below said inner ring and below said spider and adapted to engage the sides of a burner to locate said grid,
    said spider being made of a bandsaw bladelike material having its points extending downwardly.

* * * * *